United States Patent
Vaxelaire et al.

(10) Patent No.: US 6,726,291 B2
(45) Date of Patent: Apr. 27, 2004

(54) SOUND ABSORBING WHEEL

(75) Inventors: Alain Vaxelaire, Romagnat (FR); Denis Alff, Chamalières (FR); Etienne Renard, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/007,980

(22) Filed: Dec. 7, 2001

(65) Prior Publication Data
US 2002/0063468 A1 May 30, 2002

Related U.S. Application Data

(63) Continuation of application No. PCT/EP00/05094, filed on Jun. 5, 2000.

(30) Foreign Application Priority Data
Jun. 8, 1999 (FR) .............................. 99 07305

(51) Int. Cl.[7] ................................. B60B 3/12
(52) U.S. Cl. ........................ 301/63.107; 301/63.108
(58) Field of Search .................... 301/6.91, 63.101, 301/63.103, 63.106, 63.107, 63.108, 64.101, 64.102, 65

(56) References Cited

U.S. PATENT DOCUMENTS

| | | | |
|---|---|---|---|
| 1,544,242 A | * | 6/1925 | Lavery |
| 2,083,326 A | * | 6/1937 | Eksergian |
| 2,090,254 A | * | 8/1937 | Eksergian |
| 3,627,382 A | * | 12/1971 | LeJeune |
| 4,181,364 A | * | 1/1980 | Reppert |
| 4,645,267 A | * | 2/1987 | Weld |
| 4,917,440 A | * | 4/1990 | Daudi |
| 5,257,455 A | * | 11/1993 | Iwatsuki |
| 5,509,726 A | | 4/1996 | Overbeck ............... 301/63.1 |
| 6,074,015 A | | 6/2000 | Renard et al. ........... 301/6.91 |

FOREIGN PATENT DOCUMENTS

| | | |
|---|---|---|
| DE | 2457907 | 6/1976 |
| JP | 04087803 | 3/1992 |
| JP | 06106903 | 4/1994 |
| WO | 9833666 | 8/1998 |

* cited by examiner

Primary Examiner—Russell D. Stormer
(74) Attorney, Agent, or Firm—Baker Botts L.L.P.

(57) ABSTRACT

A vehicle wheel comprises a rim and a disk, the disk presenting a generally flat center zone of attachment of the disk to the vehicle, a zone of connection of the disk and the rim and an intermediate zone. The intermediate zone of the disk includes a given angular sector, or two diametrically opposite angular sectors, stiffened against axial bending relative to any other angular sector of the same central angle.

12 Claims, 19 Drawing Sheets

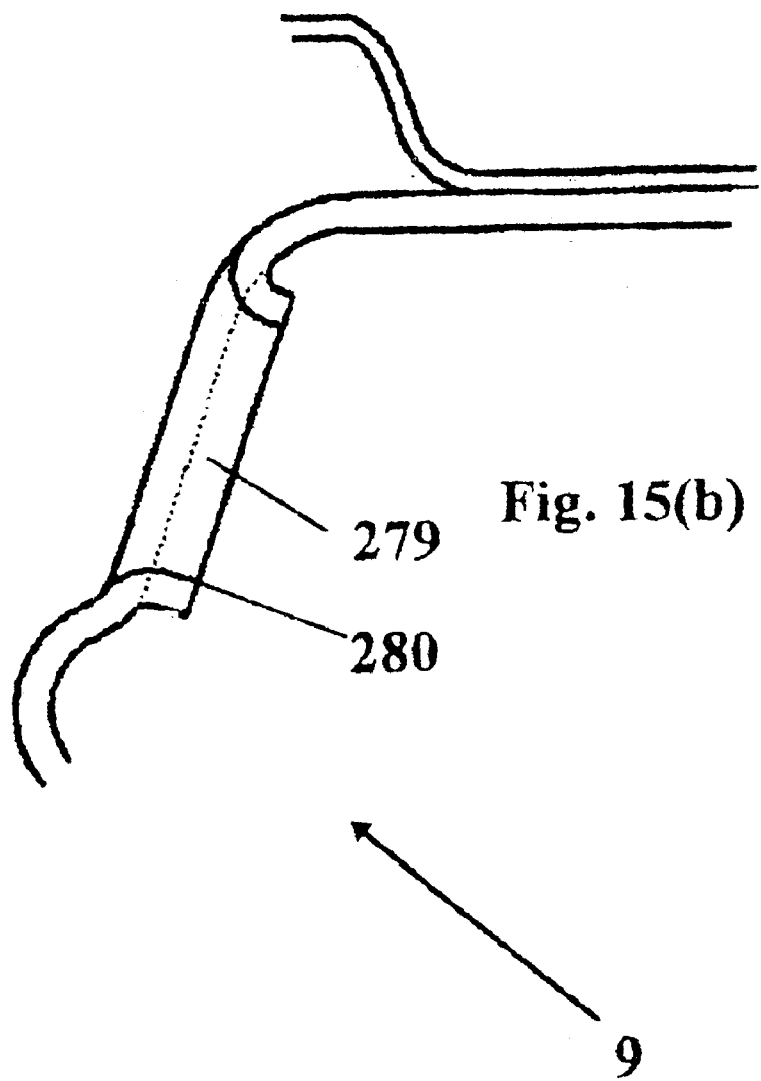

SOUND ABSORBING WHEEL

CROSS REFERENCE TO RELATED APPLICATION

This is a continuation of international application PCT/EP 00/05094, filed Jun. 5, 2000 and published as WO 00/74957 A1 in French on Dec. 14, 2000, which claims priority of French application 99/07305, filed Jun. 8, 1999.

BACKGROUND OF THE INVENTION

The invention concerns a vehicle wheel and, in particular, a wheel having special sound-absorbing properties.

When a vehicle travels over a road, its driver and passengers are seated in the passenger space in a very noisy environment. It is a constant concern of automobile manufacturers to limit the sound level of their vehicles as much as possible.

The sources of noise in the passenger compartment are highly varied. They include noises due to the engine, or of aerodynamic origin, or linked to the various hydraulic pumps or running noises of tires on the road.

The latter originate from the shocks sustained on running by the tire tread and which are audible in the passenger space of the vehicle. Such tire-running noises come within a very wide frequency range of between 80 and 800 Hz, notably with peaks toward 250 Hz. These noises are called "body hum" or "running noise."

In this frequency range, one encounters, in particular, a natural mode of vibration of the air toroid in the inner chamber of the tire, as well as four natural modes of vibration of standard wheels.

A great deal of research has been conducted to try to limit the noise in the passenger space of vehicles. For example, patent application JP 4-87803 proposes introducing a wall in the inner chamber of the tire in order to divide the inner air toroid into two parts, thereby substantially modifying its modes of vibration by displacing them beyond 500 Hz and, thus, attenuating the body hum noise peaks in the passenger space situated at approximately 250 Hz.

Another mode of action is described in application JP 6-106903. That application proposes introducing a sound-absorbing element, such as a foam, into the inner chamber of the tire, in order to attenuate the vibrations due to the resonance of the air toroid.

Application WO 98/02329 proposes a vehicle wheel in which the curved protuberance of the wheel disk is mechanically reinforced in order to raise the frequencies of several of the natural modes of vibration of the wheel. That application discloses that such a wheel makes it possible to attenuate the tire running noises heard in the passenger space of a vehicle.

The foregoing applications have not yet been put to any industrial use to date; consequently, the problem of effectively attenuating the noise heard in the passenger space of a vehicle is still pressing.

SUMMARY OF THE INVENTION

In the description that follows, the term "profile" of a wheel is understood to be the geometry of a section of a wheel in any axial plane of the wheel.

In defining the "inner" and "outer" axial orientations relative to the median plane of a wheel, the "curved protuberance" is understood to be the axially outermost part of the disk between the zone of attachment to the vehicle and the zone of connection with the rim (see FIG. 1).

When a wheel presents, in side view and from the outside, a visual continuity between the disk and the outer tire-mounting hook or flange, such a wheel is called a "full-face" wheel. Such visual continuity can be obtained by incorporating the outer flange in the disk and by assembling the disk and the rim at the outer end of the outer tire-bead seat. Such a wheel is disclosed in U.S. Pat. No. 5,509,726. A disk containing an intermediate zone can also be obtained between a zone of connection of the disk to the rim and a zone of attachment of the disk to the vehicle, which disk extends in the radial direction generally to the outer end of the outer seat of the rim.

The present invention concerns a vehicle wheel comprising a rim and a disk, the disk presenting a generally annular center zone of attachment of the disk to the vehicle and a zone of connection of the disk and the rim, as well as a radially intermediate zone. In accordance with the invention, the intermediate zone of the disk contains an angular sector, or two given diametrically opposite angular sectors, which is, or are, stiffened against axial bending relative to any other angular sector of the same central angle.

Consequently, the tilting rigidity of the wheel relative to an axis passing through the zone of attachment of the disk to the vehicle is maximal when the axis is at right angles to the center axis of the given angular sector or sectors.

As will be explained below, the wheel according to the invention provides a frequency split of one of the natural modes of vibration of the disk. The mean vibration frequency of the two resulting natural modes of vibration is greater than the frequency of the same natural mode of a comparable standard wheel.

The applicants have observed that such a wheel possesses remarkable properties of attenuation of the body hum noise detected in the passenger space of a vehicle equipped with such wheels.

By way of example, a wheel according to the invention includes, in the given angular sector or sectors and in at least one part of the disk profile, an increase in at least one geometric parameter chosen from the group consisting of the disk thickness, the axial distance relative to the median plane of the wheel, and the radial distance relative to the axis of rotation of the wheel.

When the intermediate zone of the wheel disk includes a zone of openings and a curved protuberance, the thickness, the axial position and/or the radial position of the curved protuberance in the given angular sector or sectors can be increased. Such increases can be continuous or discontinuous. In the latter case, localized bosses can be provided, for example.

The intermediate zone of a wheel according to the invention can be locally stiffened by ribs of radial orientations, for example, by welded reinforcements or by a localized reduction of surface area of its openings.

The zone of openings can also be stiffened locally by means of openings containing means of stiffening, such as beads.

According to another embodiment, in the one or two given angular sectors, the link between the disk and the rim is arranged under the outer seat of the rim. In the other sectors, the link is arranged under the rim well.

According to an alternative embodiment, in the one or two given angular sectors, the link between the disk and the rim is arranged under the outer hook or flange of the rim. In the other sectors, the link is arranged under the rim well.

BRIEF DESCRIPTION OF THE DRAWINGS

Several embodiments of the invention are described below by way of nonlimitative example, based on the following figures, in which:

FIGS. 15(a) and 15(b) present a standard wheel profile and a wheel profile with a stiffened opening, respectively.

DESCRIPTION OF ILLUSTRATIVE EMBODIMENTS

Figure 1:
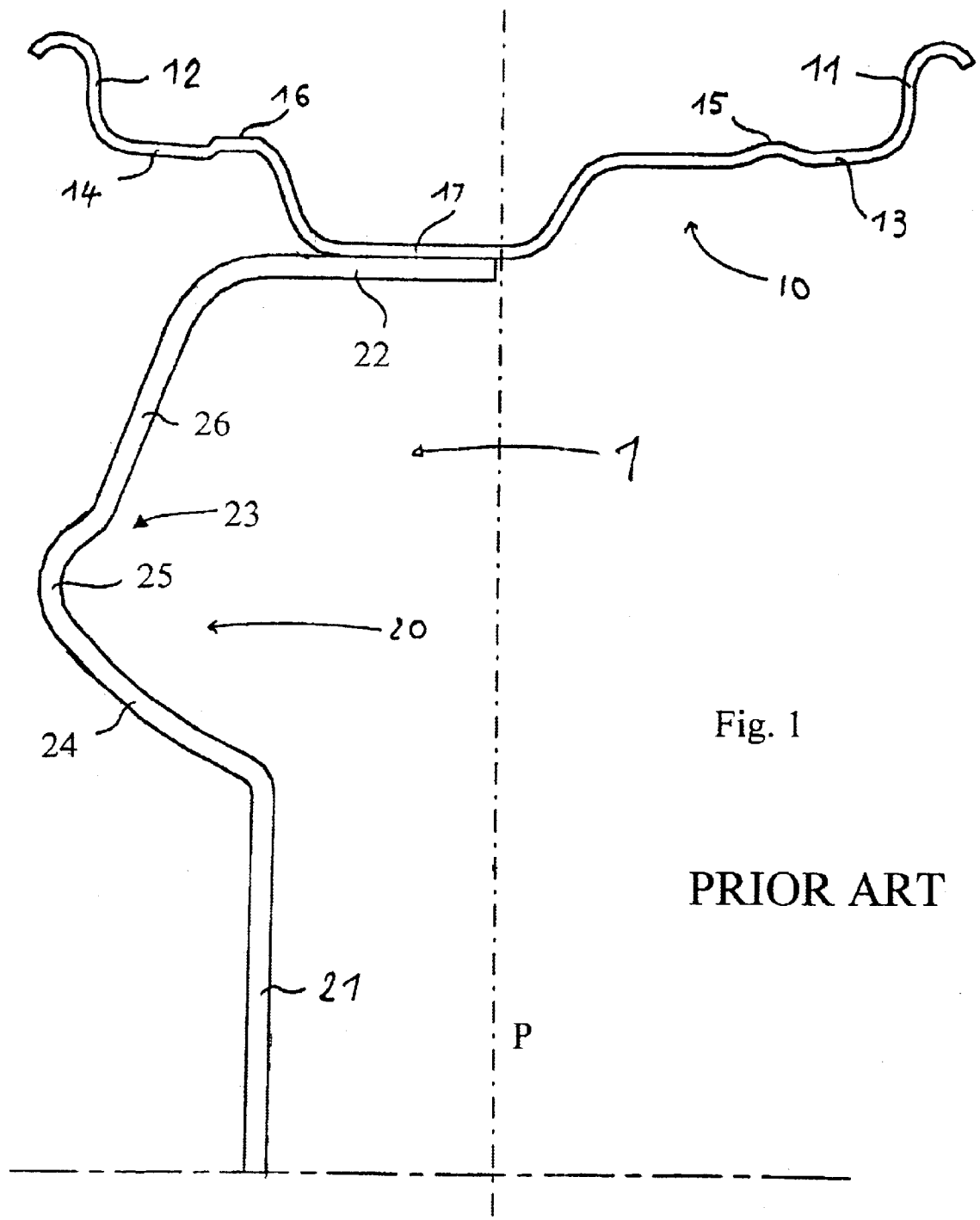
FIG. 1 represents a half-section of a standard sheet steel passenger car wheel.
Figure 2:
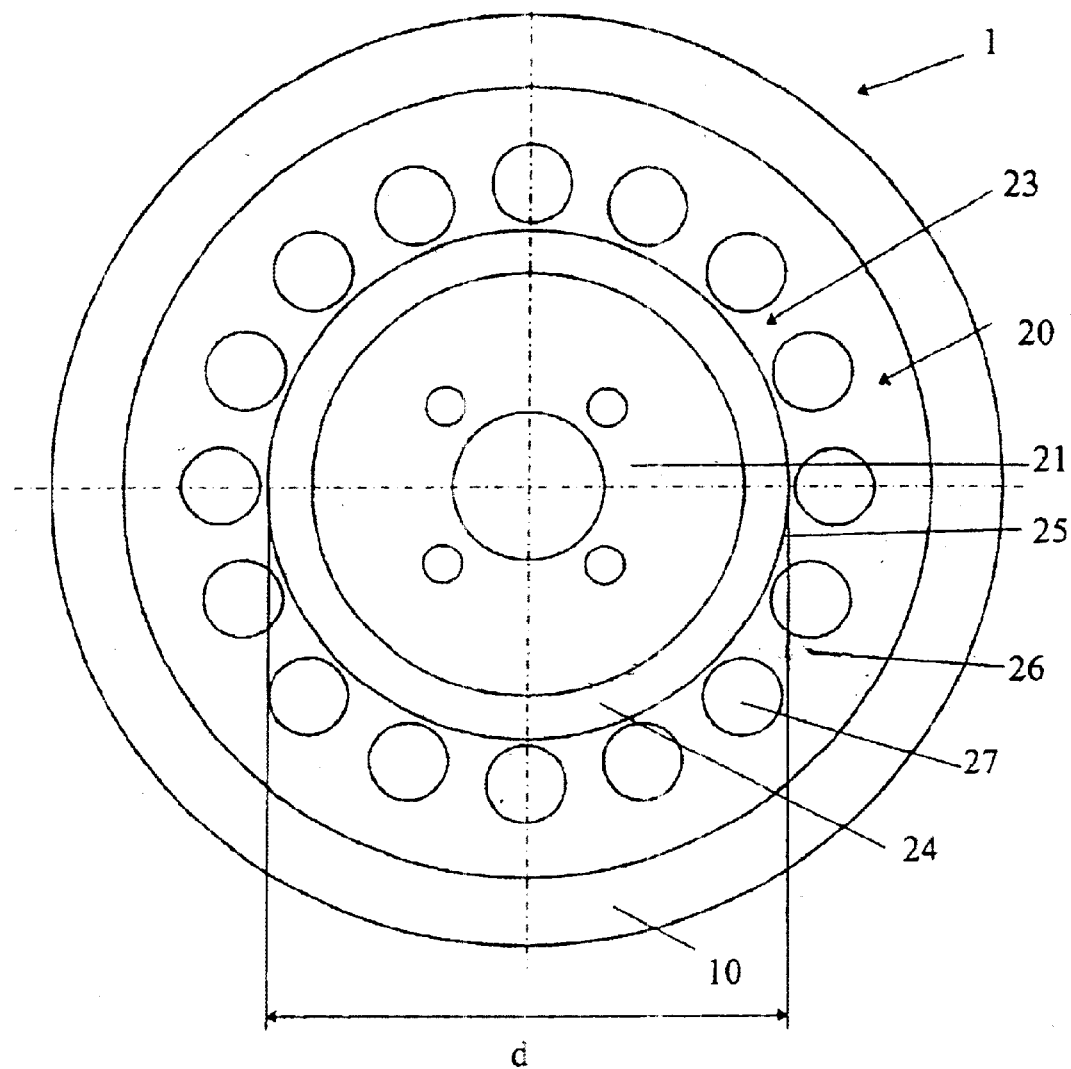
FIG. 2 is a side view of the wheel of FIG. 1.

In FIGS. 1 and 2, a standard sheet steel passenger car wheel with reference "5½J×14" is represented, where 5½ is the width code of the rim, J is the profile, and 14 is the nominal diameter code. That wheel comprises a rim 10 and a disk 20. Taking the position of the disk 20 relative to the median plane P of the wheel 1 as a reference for defining the axially outer and inner sides, the rim 10 presents two hooks or flanges, inner 11 and outer 12, two seats, inner 13 and outer 14, two anti-unseating bosses or "humps," inner 15 and outer 16, and a rim well 17.

The disk 20 comprises a center zone of attachment 21 to the vehicle or hub bearing, a zone of connection 22 with the rim and an intermediate zone 23. The zone of attachment 21 to the vehicle is a generally flat and annular zone. It usually contains a center hole and the holes (not represented) intended to receive the vehicle connecting bolts. The intermediate zone 23 comprises a curved channel 24, a curved protuberance 25 and a zone of openings 26 containing a series of openings 27 (FIG. 2). The curved protuberance 25 is the axially outermost part of the disk. The diameter of the curved protuberance is d (FIG. 2).

When such a wheel is mechanically excited, it can enter into resonance according to several natural modes of vibration. The determination of those natural modes is made by fastening the wheel to a seismic mass, for example, then exciting it with a shock by means of a dynamometric hammer, registering the relative acceleration to that excitation by means of accelerometers and calculating the transfer function $\gamma/F=f(v)$, where $\gamma$ is the acceleration measured in $m/s^2$, F the force of the shock imposed in newtons and v the vibration frequency in hertz.

Figure 3A:
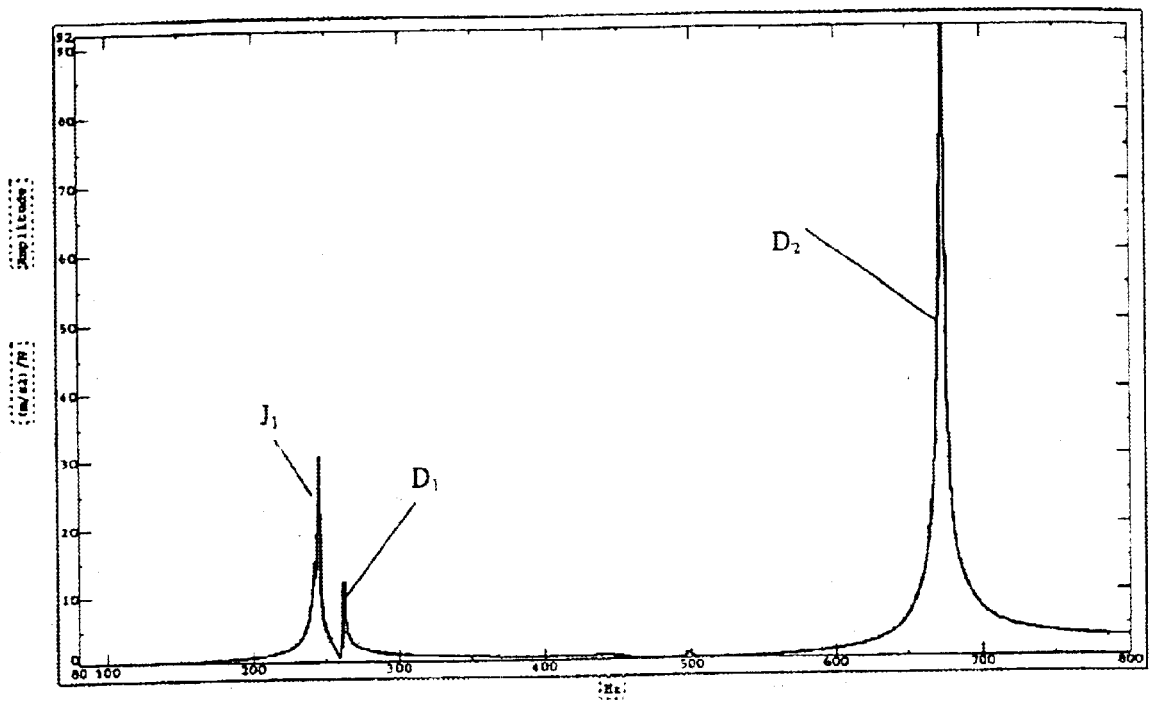
FIGS. 3(a) and 3(b) present the vibration response of two wheels to shock excitation, with a standard wheel in (a) and a wheel according to the invention in (b)

FIG. 3(a) presents such a curve $\gamma/F=f(v)$ for the wheel of FIGS. 1 and 2. On that curve, the presence of three peaks is observed in the 80–800 Hz range. Those peaks correspond to three standard natural modes of vibration of the wheel in that frequency range.

There are two natural modes of vibration of the disk, $D_1$ and $D_2$, so called because it is mainly the disk 20 which is deformed. The first mode of the rim $J_1$ is also observed.

Figure 4:
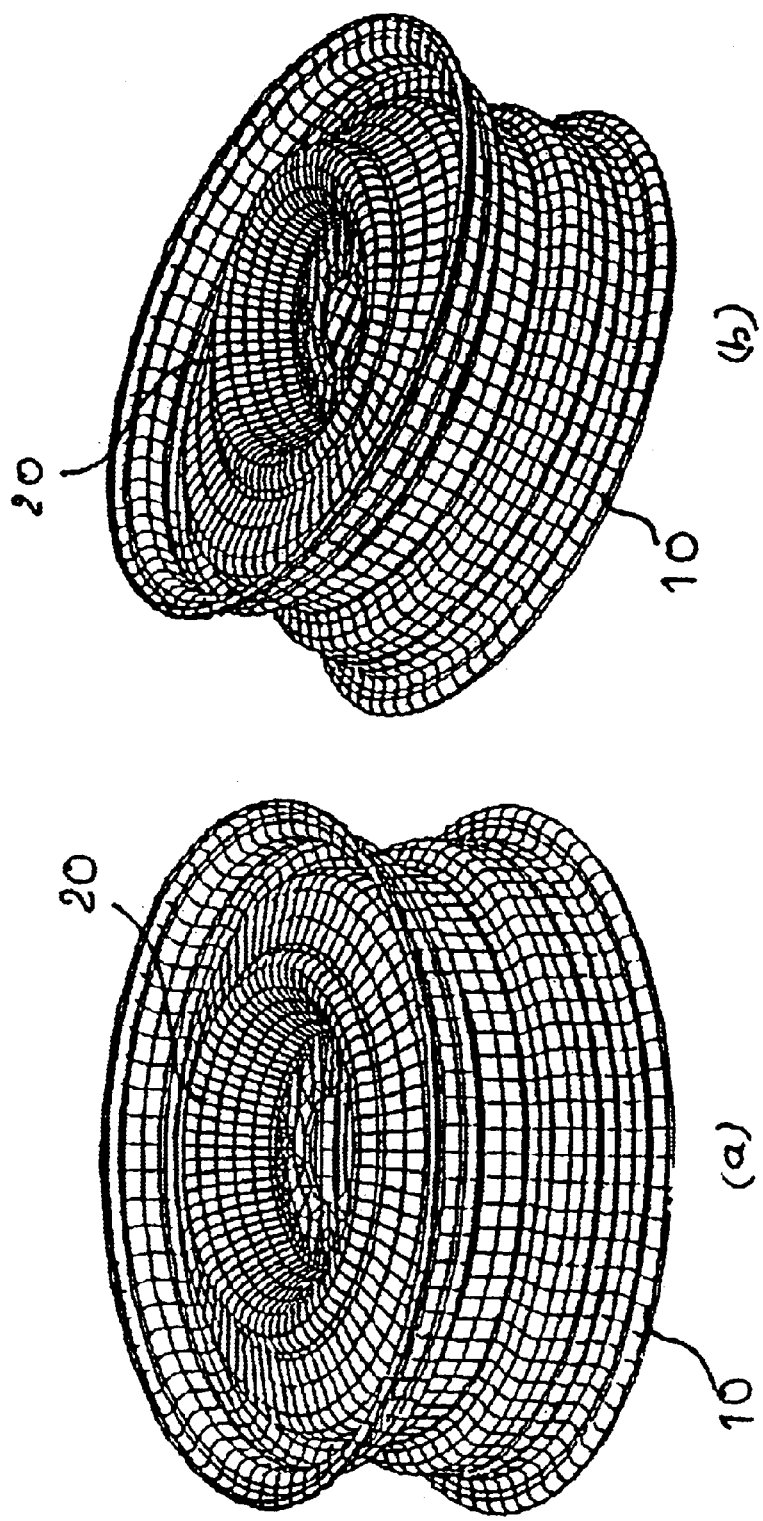
FIG. 4 illustrates a standard vibration of the wheel disk of FIGS. 1 and 2, with an undeformed wheel in (a) and the same wheel with an amplified deformation in (b)

The first natural mode of the disk $D_1$ is called the tilting mode of the disk. It corresponds to the second peak of FIG. 3(a) and is situated toward 270 Hz. That natural mode is illustrated in FIG. 4, which shows in perspective: in (a), the undeformed wheel, and in (b), the wheel with a markedly amplified deformation corresponding to the natural mode. That natural mode is, in fact, double, with tilting taking place along two orthogonal tilting axes at the same frequency and in phase opposition.

This first natural mode of the disk $D_1$ corresponds to a tilting of the rim assembly 10 on an axis lying in the plane of the hub bearing portion 21 of the disk 20.

The second natural mode of the disk $D_2$, called the pumping mode, is situated at around 670 Hz (FIG. 3(a).

In the other natural mode $J_1$, it is mainly the rim 10 which is deformed. It is called rim mode and is situated at around 240 Hz.

The vehicle body hum analysis test is carried out by placing a mannequin equipped with microphones in the passenger space of a vehicle. The output signals of the microphones are registered and analyzed in acoustic power overall and in octave third bands. The results of a test are presented by the variation of acoustic powers of the solution tested relative to the acoustic powers of a reference.

In what follows, particular attention will be paid to the tilting mode $D_1$ of the wheel disk.

Figure 5:
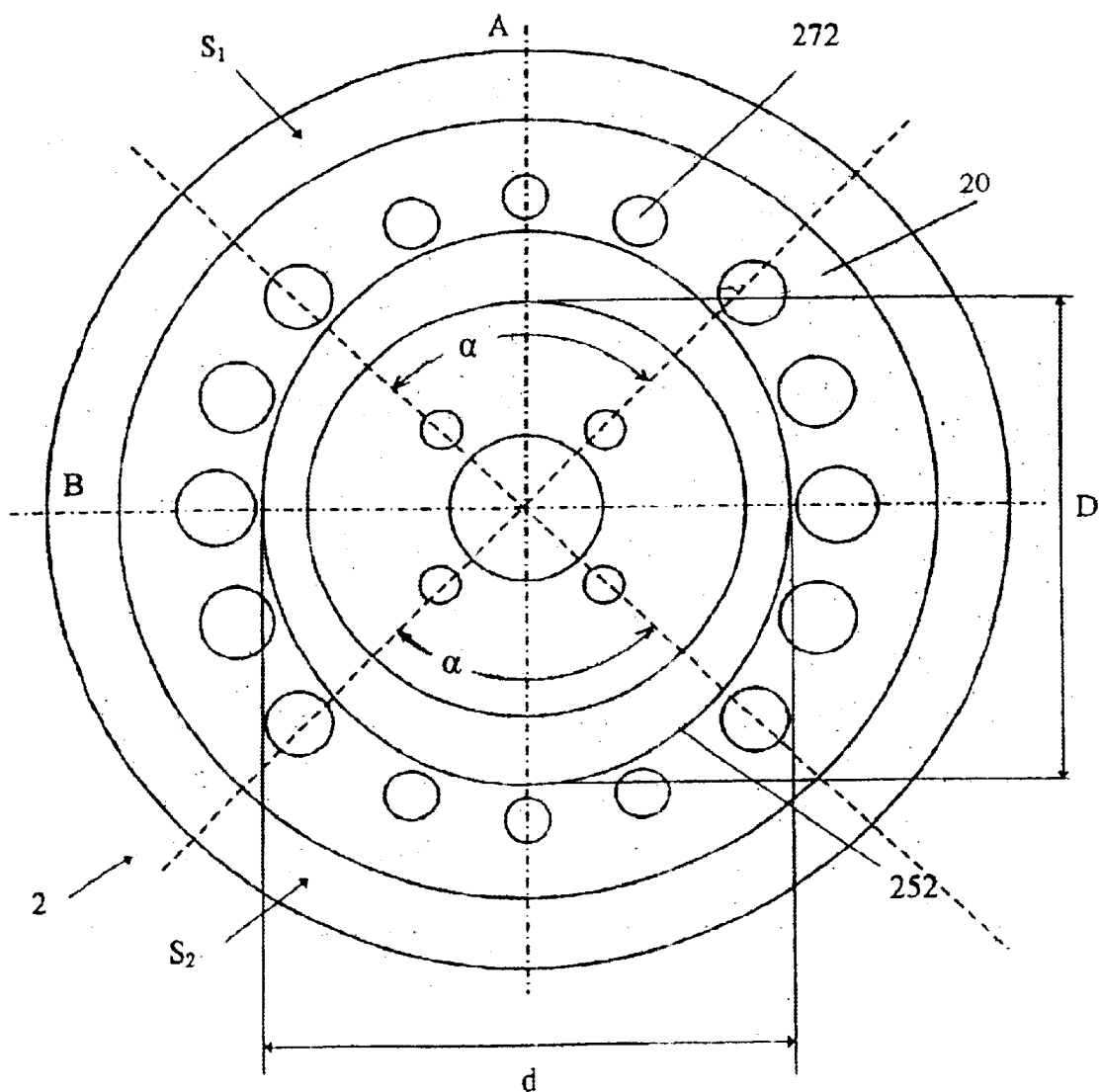
FIG. 5 presents a side view of an embodiment of a wheel according to the invention, with an oval curved protuberance.

FIG. 5 presents an embodiment of a wheel 2 according to the invention. Except as otherwise noted, the wheel 2 has the same construction as the standard wheel 1. As shown in FIG. 5, the wheel 2 comprises a disk 20, the curved protuberance 252 of which is oval shaped. The radial position of the curved protuberance 252 varies with the azimuth taken through the central axis of the wheel and presents two diametrically opposite maxima along axis A and two diametrically oppose minima along axis B. The two axes A and B are at right angles. The two angular sectors $S_1$ and $S_2$ are centered about the axis A. The maximum diameter of the curved protuberance 252 in the direction of axis A is D, and the minimum diameter in the direction of axis B is d.

Consequently, in all diametrically opposite sectors $S_1$ and $S2$ centered about axis A, whatever the central angle α subtended by the sectors, the radial height of the curved protuberance 252 is substantially greater than that observed in the rest of the disk of wheel 2, as well as that d/2 observed in the disk of the corresponding standard wheel 1 (FIG. 2).

Figure 6:
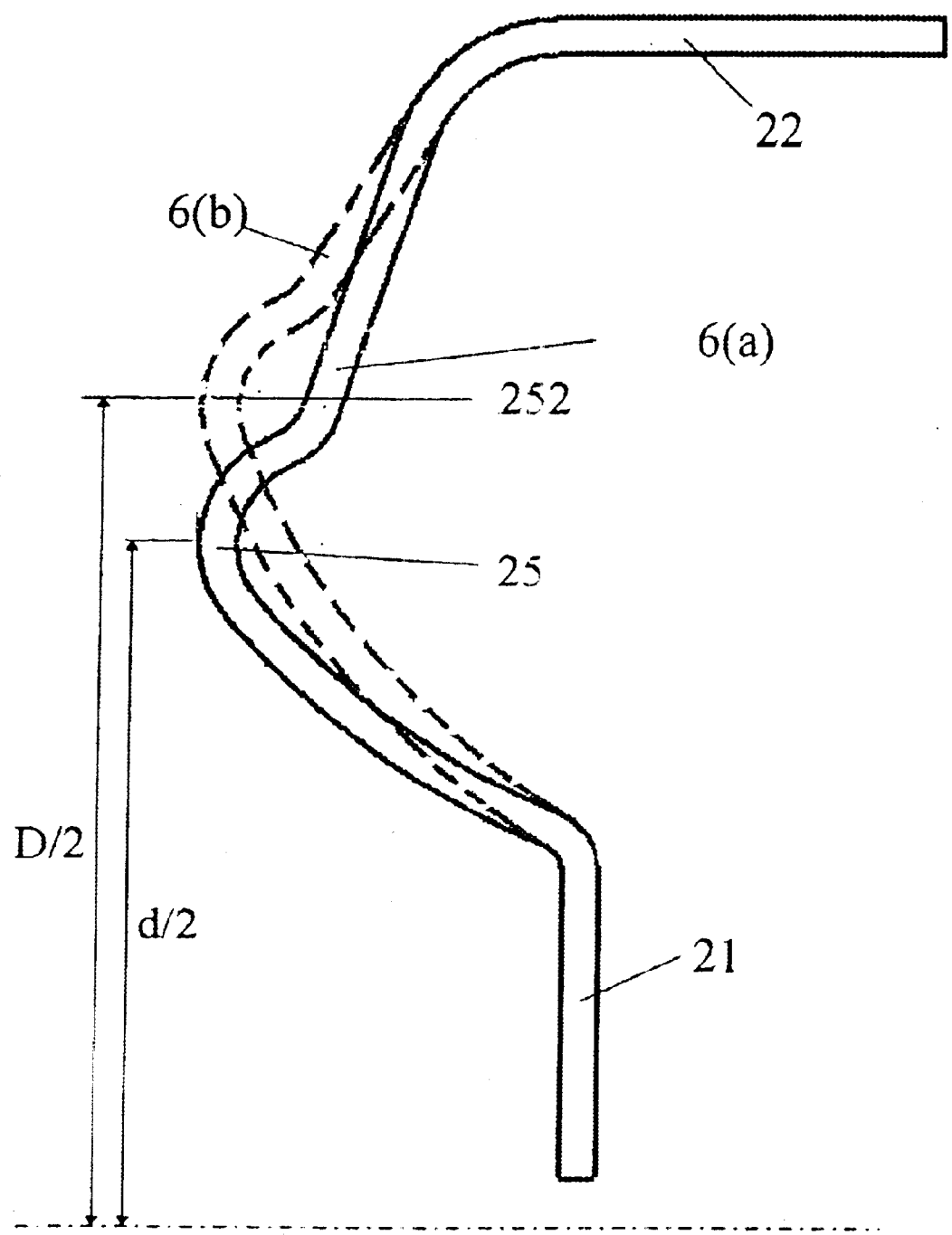
FIGS. 6(a) and 6(b) present, in superposition, two perpendicular profiles of the wheel disks of FIG. 5.

FIGS. 6(a) and 6(b) illustrate the variation of the radial height or distance of the curved protuberance, 25 and 252 respectively, in wheel 2 as a function of the azimuth, relative to that of the standard wheel 1. FIG. 6(a) presents the profile of the disk of the standard wheel 1, whatever its azimuth (with the exception of the openings not represented). This profile also corresponds to that of the disk of the wheel 2 in an axial plane passing through axis B. FIG. 6(b) presents the profile of the disk of wheel 2 in an axial plane passing through axis A. FIGS. 6(a) and 6(b) are superimposed for clarity of illustration.

The oval shape of the curved protuberance 252 of the wheel 2 also entails a corresponding modification of the zone of openings of the curved channel of the disk. In particular, the diameter of the openings 272 becomes smaller and smaller as they approach axis A, as is shown in FIG. 5.

Figure 13:
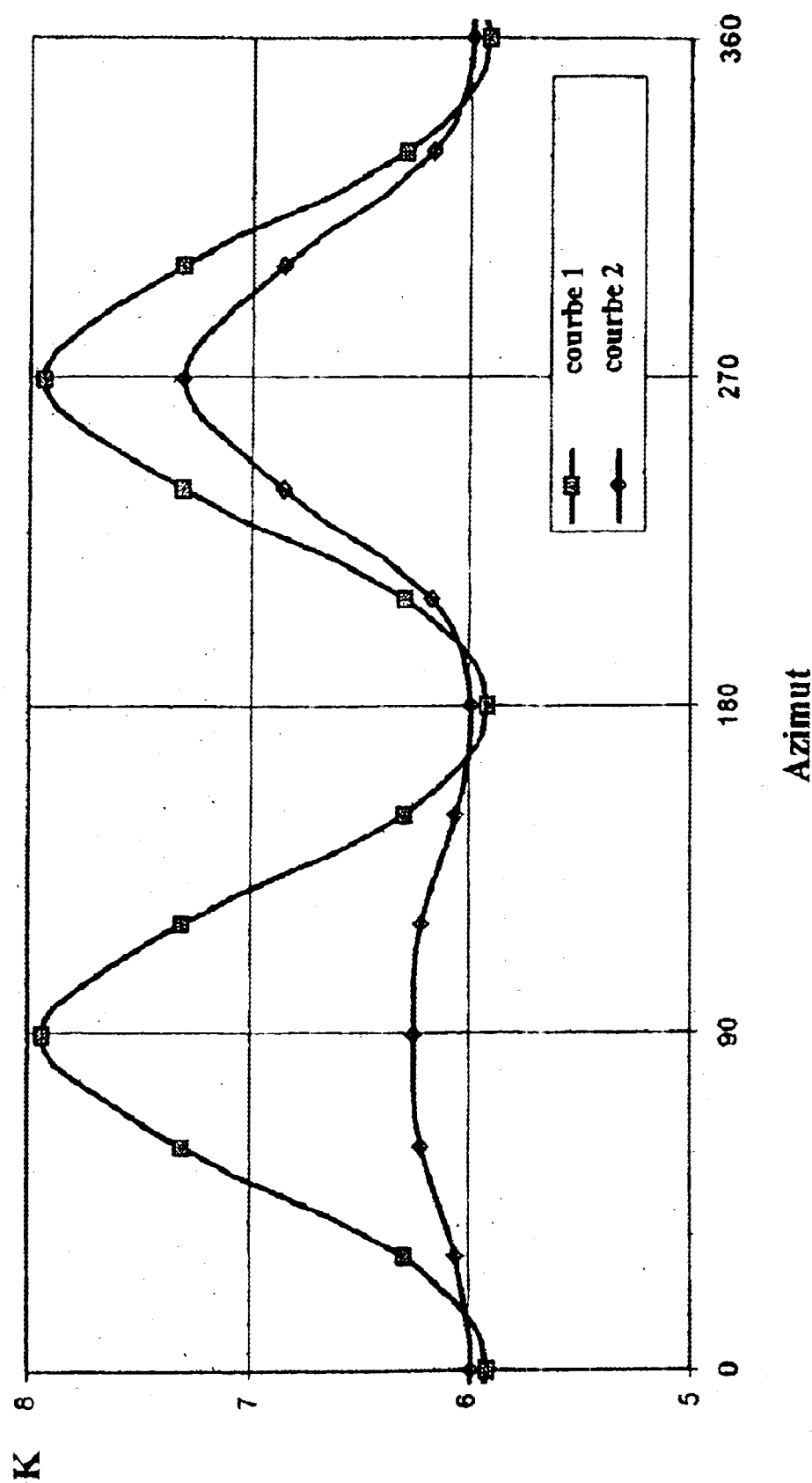
FIG. 13 presents the curves, as a function of the azimuth, of the flexural strength of two wheels according to the invention.

The increase in the radial distance of the curved protuberance relative to the axis of wheel 2 results in an increase of stiffness of the disk 20. FIG. 13 presents on curve 1 a plot of the variation of axial flexural strength K as a function of the azimuth of the wheel 2 of FIG. 5. That axial flexural strength K is measured by rigidly fastening the hub bearing of the wheel flatwise to a rigid mass. A localized load is then successively applied to a set of rim flange points evenly distributed on the circumference and, for each point, the resulting axial displacement is measured. The curve of the axial flexural strength K of a wheel can also be determined by numerical means of simulation by finite elements, for example.

FIG. 13 clearly shows the presence of two diametrically opposite peaks of the axial flexural strength directly corresponding to the variation of position of the curved protuberance 252. Consequently, the tilting rigidity of the disk and the rim relative to an axis of rotation situated at the hub bearing 21 is maximal when that axis of rotation is oriented in the direction B at right angles to the direction A.

Figure 3B:
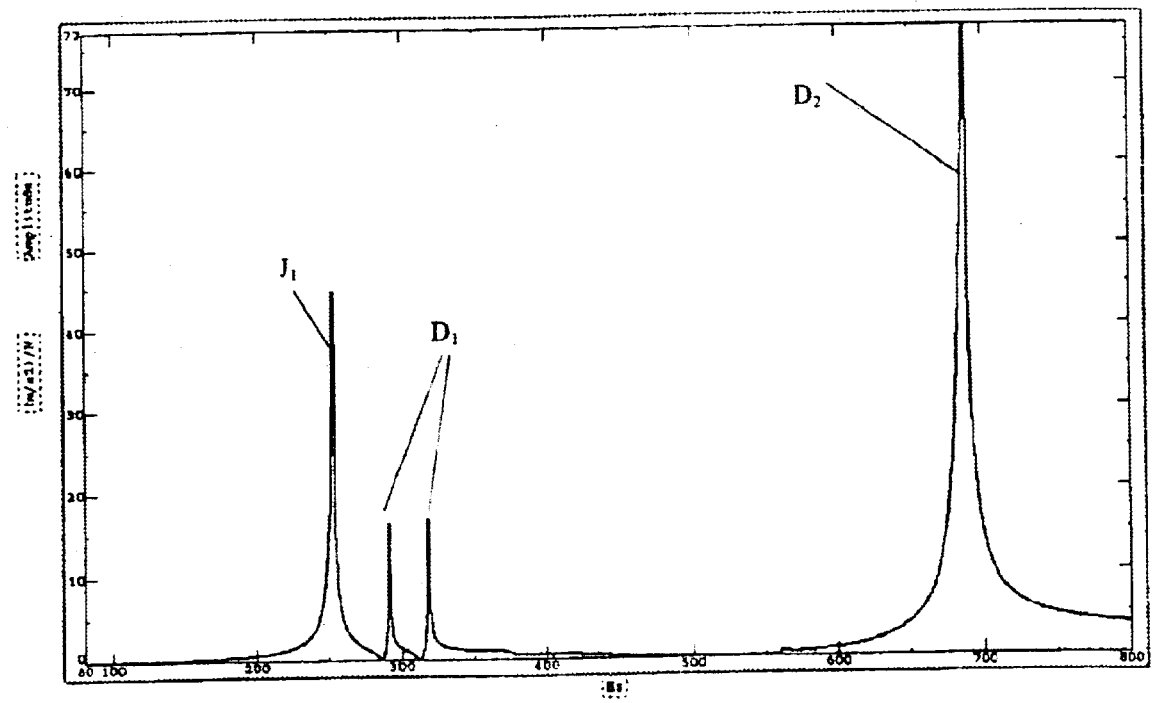

The variation of tilting rigidity of the wheel defines the two orthogonal directions A and B as corresponding to the tilting movements of the first natural mode of the wheel disk $D_1$ actually observed upon resonance of the wheel. Thus, the first natural mode of resonance of the disk of FIG. 5 is divided with two different frequencies, as compared with only one frequency upon the resonance of a standard wheel 1 of FIG. 1. This is shown in FIG. 3(b), where the natural mode of tilting of the disk $D_1$ is split into two close peaks of frequencies 290 Hz and 315 Hz instead of 270 Hz, as previously. The other natural modes are not substantially modified.

Figure 7:
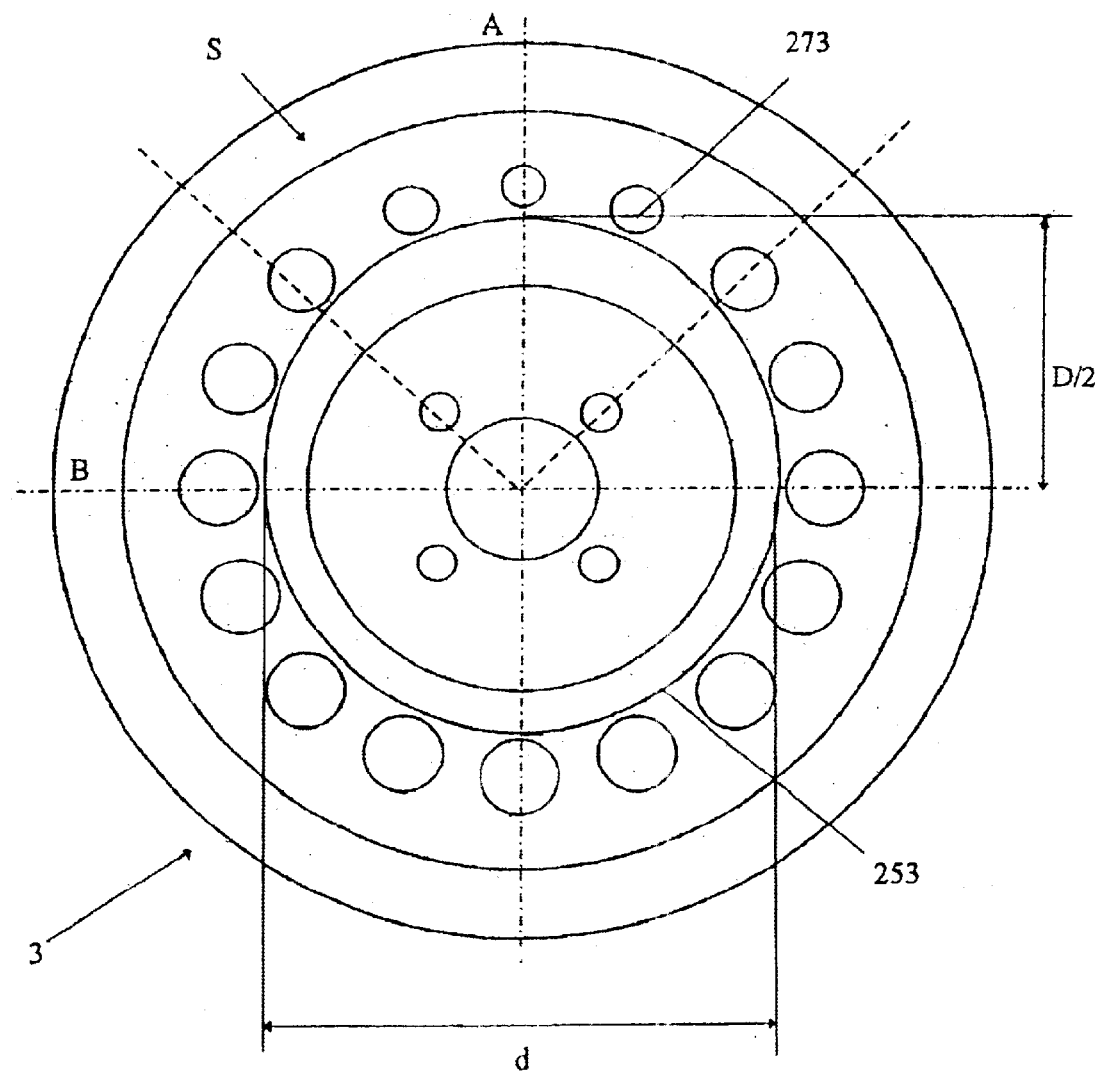
FIG. 7 presents a side view of another embodiment of a wheel according to the invention, with a curved protuberance whose radial position represents a maximum as a function of the azimuth.

FIG. 7 depicts a second embodiment of a wheel 3 according to the invention. Except as otherwise noted, the wheel 3 has the same construction as the standard wheel 1. As previously, the radial position of the curved protuberance 253 of the wheel 3 varies with the azimuth, but presents only one maximum in the direction of axis A. The shape of the curved protuberance 253, therefore, associates a half-circle and a half-oval. As in the case of the disk of wheel 2, the variation of radial height of the curved protuberance 253 results in a stiffening of the disk, so that the tilting rigidity of the disk and the rim relative to an axis of rotation situated at the hub bearing 21 is maximal when that axis of rotation is oriented in the direction B, i.e., at right angles to direction A.

FIG. 13 presents in curve 2 the plot of the axial flexural strength of the wheel 3 as a function of the azimuth. Very logically, a strength peak associated with the radial height peak of the curved protuberance 253 is observed at about 270 degrees. The presence of a notably lower peak is also observed at 180 degrees.

The profile of the disk of wheel 3 in an axial plane passing through A on the side of the maximum axial height D/2 of the curved protuberance 253 corresponds to that of FIG. 6(b), while on the opposite side the disk profile corresponds to that of FIG. 6(a).

Figure 9:
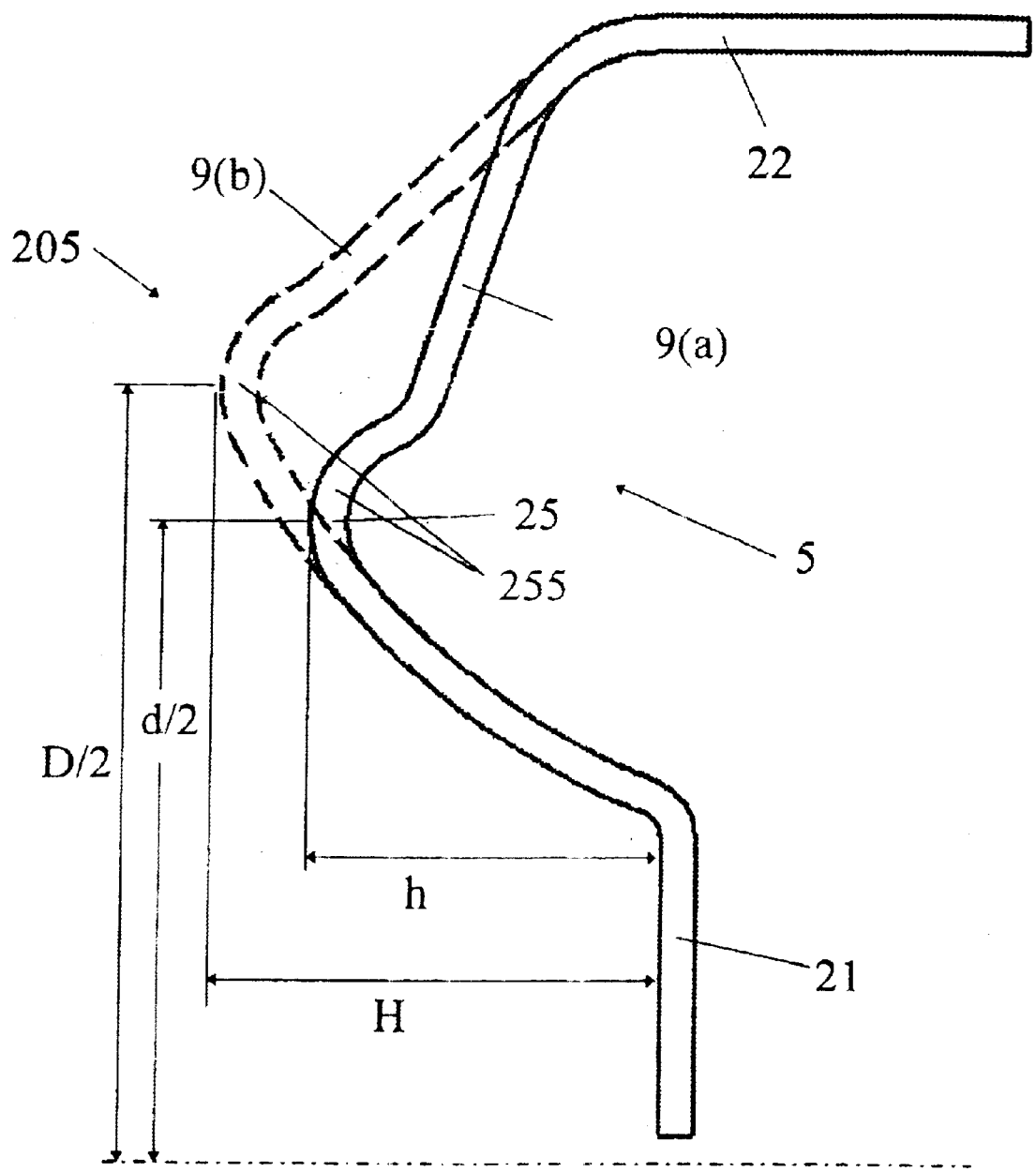
FIGS. 9(a) and 9(b) present, in a view similar to FIGS. 6(a) and 6(b), two perpendicular profiles of a wheel disk in which the axial and radial distances of the contour present one or two maxima.

The first two embodiments of a wheel according to the invention (FIGS. 5 and 7) present a first continuous variation characteristic of the profile of the wheel disk; i.e., the radial position of the curved protuberance 252, 253. If desired, the variation of the radial position of the protuberance 252, 253 could be formed by circumferentially localized humps as shown in FIG. 9, for example.

Figure 8:
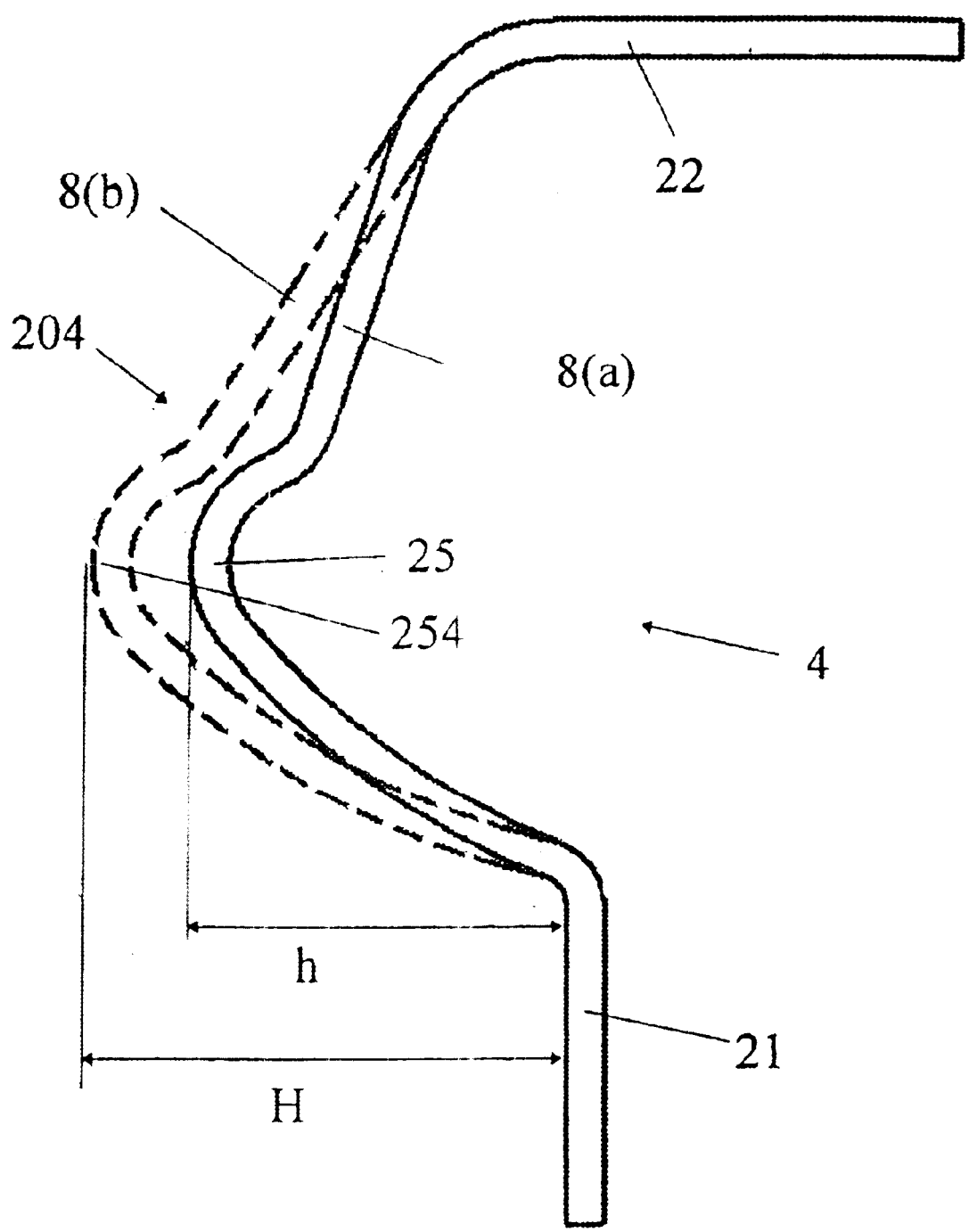
FIGS. 8(a) and 8(b) present, in a view similar to FIGS. 6(a) and 6(b), two perpendicular profiles of a wheel disk in which the axial distance of the contour presents one or two maxima.

Another embodiment of a wheel disk according to the invention is illustrated in FIGS. 8(a) and 8(b). Those figures are similar to FIGS. 6(a) and 6(b) and present two orthogonal profiles of the disk 204 of wheel 4. The disk 204 of that wheel has an axial position (in the direction of the central axis of the wheel) of its curved protuberance 254 which varies as a function of the azimuth. The axial distance between the plane of the hub bearing portion 21 of the disk and the axially outer end of the curved protuberance 254 varies between h and H. Value H is associated with a diameter oriented along an axis A and value h is associated with the diameter oriented along an axis B. As previously, axes A and B are at right angles to one another and correspond to the two principal directions of the first natural mode of resonance of the disk. The variation of the axial distance of the curved protuberance 254 relative to the median plane of the wheel can very easily be limited to a circumferentially localized hump.

The disk 254 can present two maxima of axial distance of the curved protuberance 254 or only one maximum.

FIGS. 9(a) and 9(b) present two perpendicular profiles along axes B and A, respectively, of another disk 205 of a wheel 5 according to the invention. The curved protuberance 255 of the disk 205 has a double variation of profile as a function of the azimuth. In the direction of axis A, the radial distance relative to the axis of the wheel is maximal D/2, and the axial distance relative to the hub bearing 21 is maximal H. In the direction of axis B, the radial distance relative to the axis of the wheel is minimal d/2, and the axial distance relative to the hub bearing 21 is minimal h. Both axial and radial variations of position of the curved protuberance are thus in phase. The axial variation can be localized or continuous.

The wheel 5 also presents a greater tilting rigidity variation as a function of the azimuth. The amplitude of the difference between the two frequencies of vibration of the natural mode of tilting of the disk 205 is markedly increased. That shift mainly takes place toward the high frequencies. It is thus observed that, while substantially maintaining the same weight of the wheel, the rigidity of the wheel can be increased.

Figure 10:
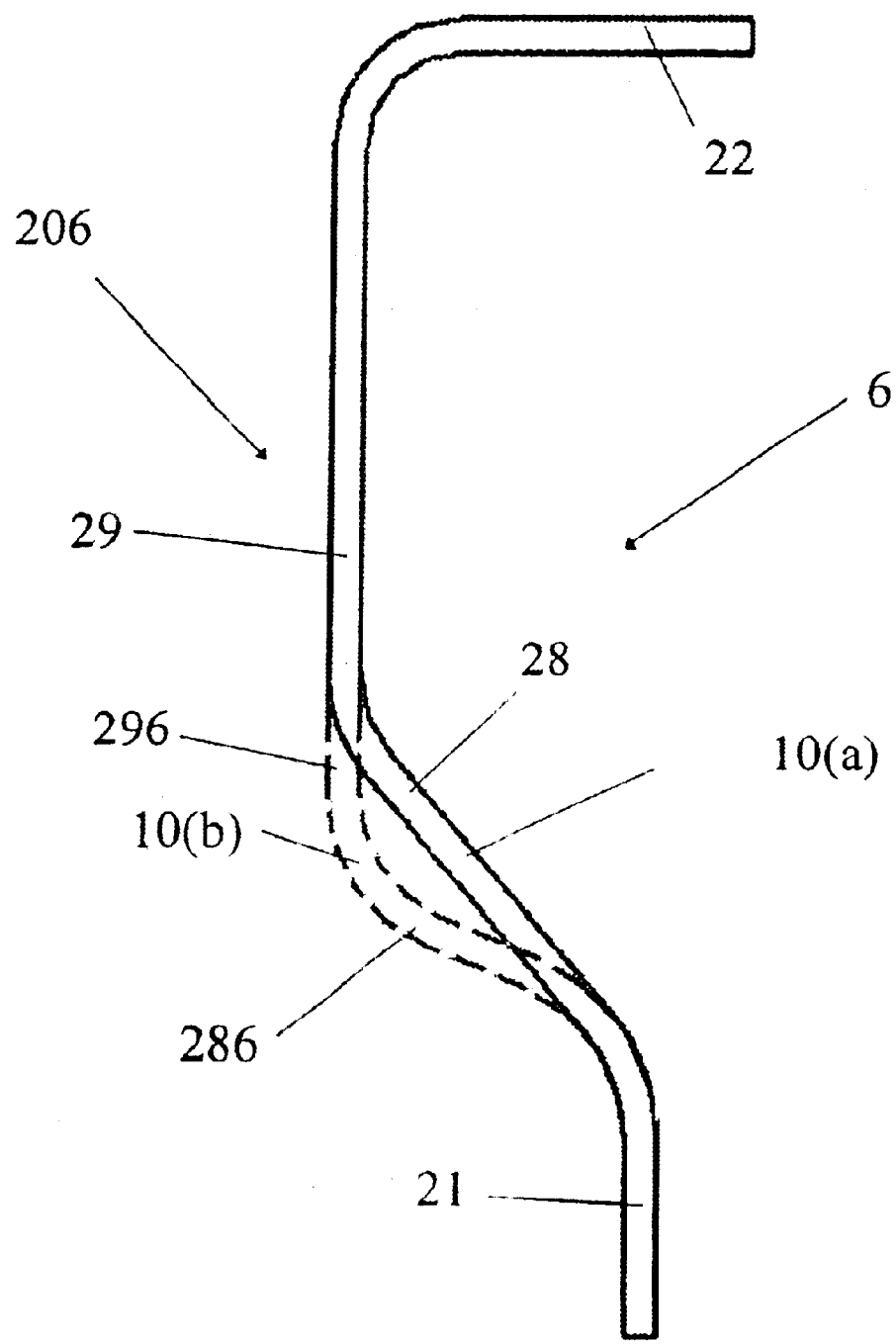
FIGS. 10(a) and 10(b) present two perpendicular profiles of a full-face wheel disk according to the invention.
Figure 11:
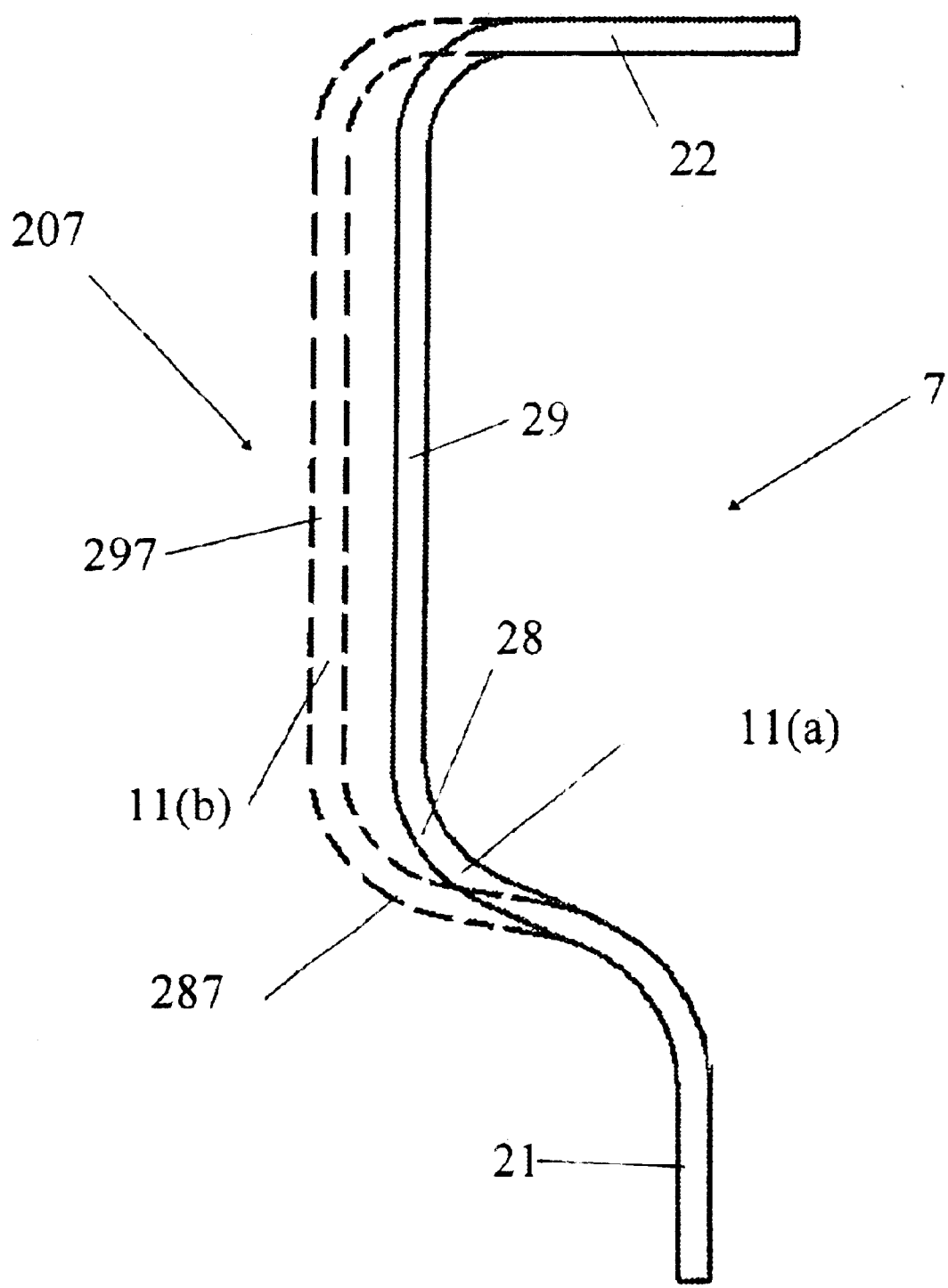
FIGS. 11(a) and 11(b) present two perpendicular profiles of a second full-face wheel disk according to the invention.

FIGS. 10 and 11 present two other embodiments of a wheel disk 206, 207 according to the invention corresponding to full-face wheels. As previously, those figures correspond to a superposition of two disk profiles in order to bring out the maximum evolutions in orthogonal directions A and B.

The disk 206 is a disk for a full-face wheel. The intermediate zone of that disk comprises a contour 29 of appreciably radial orientation and a channel 28 (FIG. 10(*a*)). In the perpendicular direction along A (FIG. 10(*b*)), it is observed that the channel is much more inclined relative to the axis of the wheel, which lengthens and ovalizes the contour 296.

The disk of FIG. 11 corresponds to an increase of the axial distance h of the contour 297 in direction A (FIG. 11(*b*)) relative to the standard contour illustrated in FIG. 11(*a*). The channel 287 is, of course, adapted to account for the extended axial distance h.

The examples presented in the foregoing figures correspond to continuous variations of one or more geometric parameters of the intermediate zone of the wheel disks intended to introduce strong variations of rigidity according to the azimuth. Those variations can be also discontinuous and obtained by circumferentially localized humps. The thickness of the disk is also among the parameters usable. Thus, the thickness of the curved protuberance can, for example, be increased in a given angular sector in order to obtain a precise definition of the two axes A and B.

Figure 14:
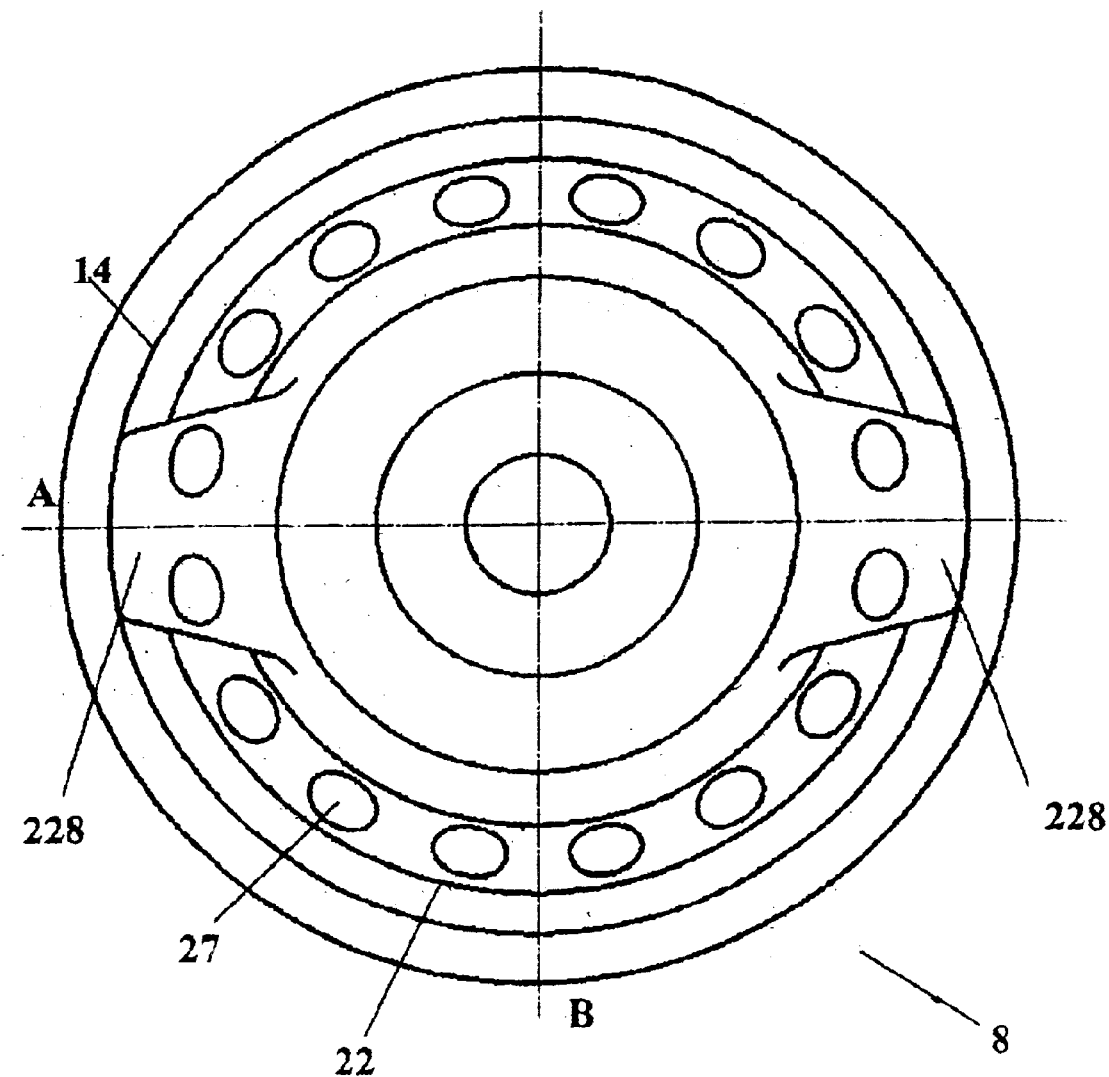
FIG. 14 presents, in side view, a wheel according to the invention with a fitting under the mounting groove and a link under the outer seat.

FIG. 14 presents another embodiment of a wheel 8 according to the invention. That wheel 8 has a standard disk fitting under the well 17 of the rim 10 over the largest part of its circumference. But it also has two arms or links 228 which are directly welded under the outer seat 14 of the rim 10. Those two arms or links 228 are located at 180° from each other along an axis A and very appreciably increase, as previously, the axial flexural strength in direction A, that is, against being about axis B.

Figure 15A:
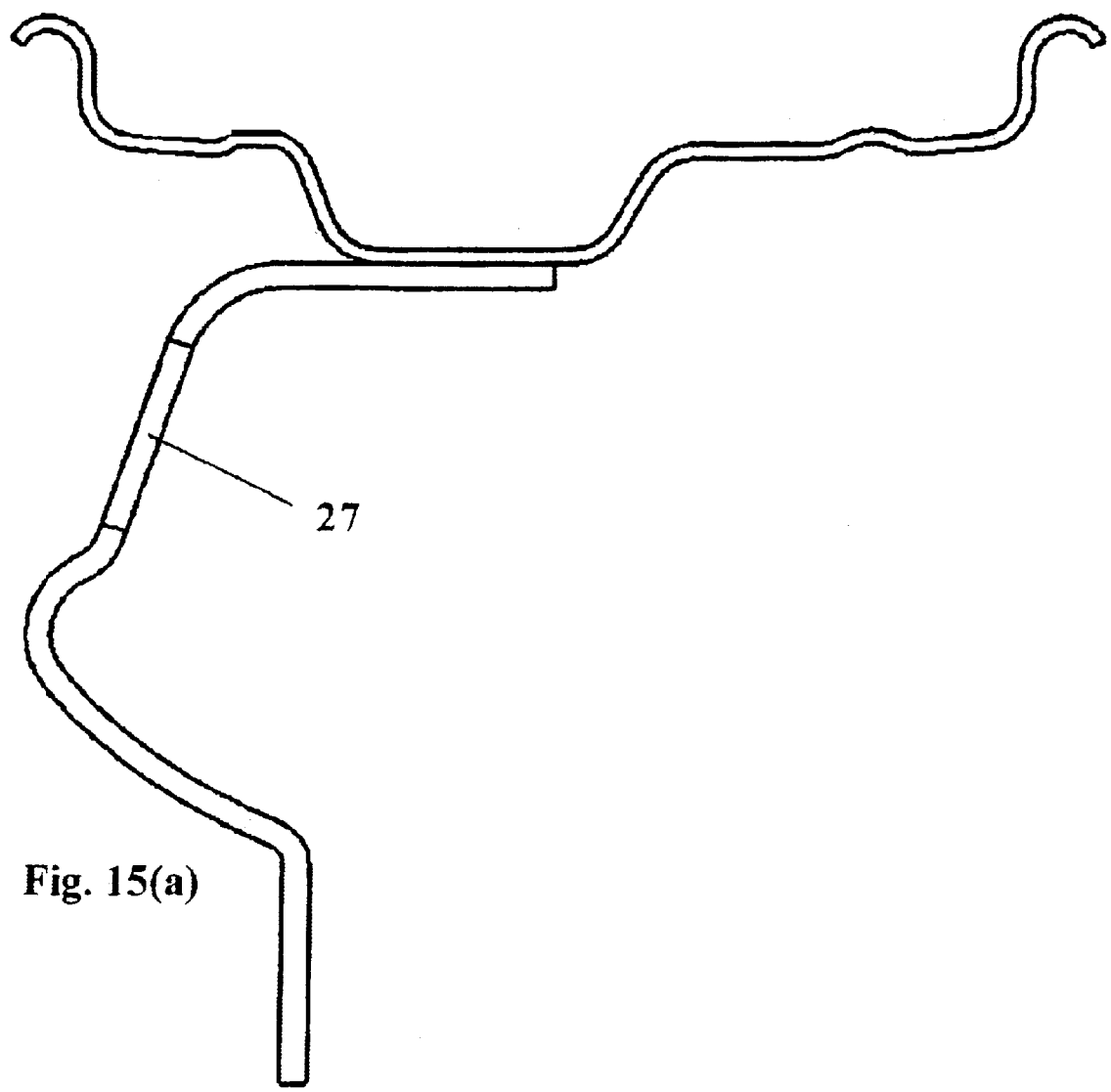

FIG. 15(*a*) presents an axial section of a wheel 9 according to the invention with an opening 27. This section is similar to that of a standard wheel 1. In FIG. 15(*b*), the wheel 9 contains an opening 279, the edges 280 of which have been turned inward by an additional mechanical operation. The incurved edge 280 appreciably increases the flexural strength of the disk along the corresponding azimuth. This is another embodiment of a wheel according to the invention.

Figure 16:
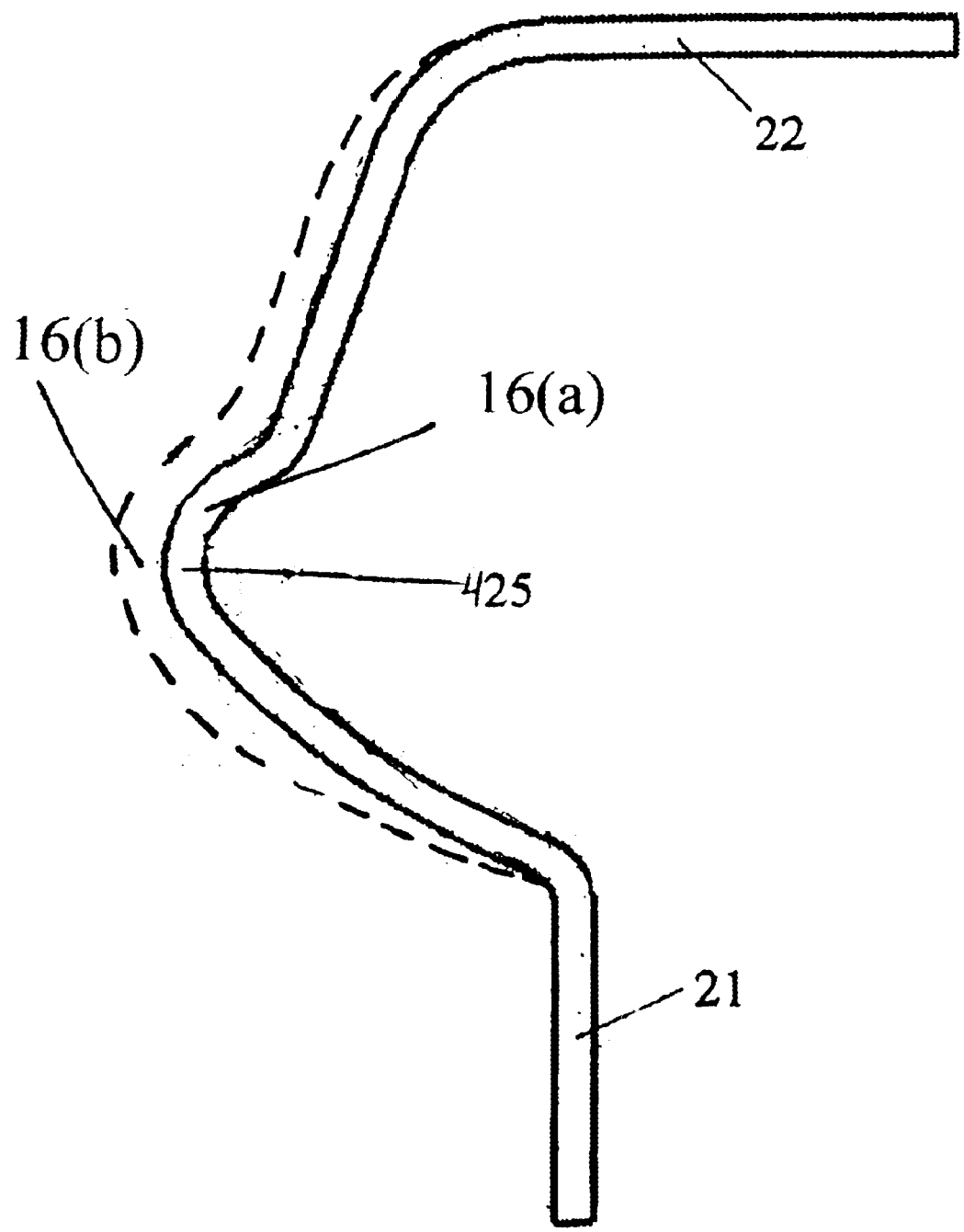
FIG. 16 presents a wheel disk having an increase in the disk thickness.
Figure 17:
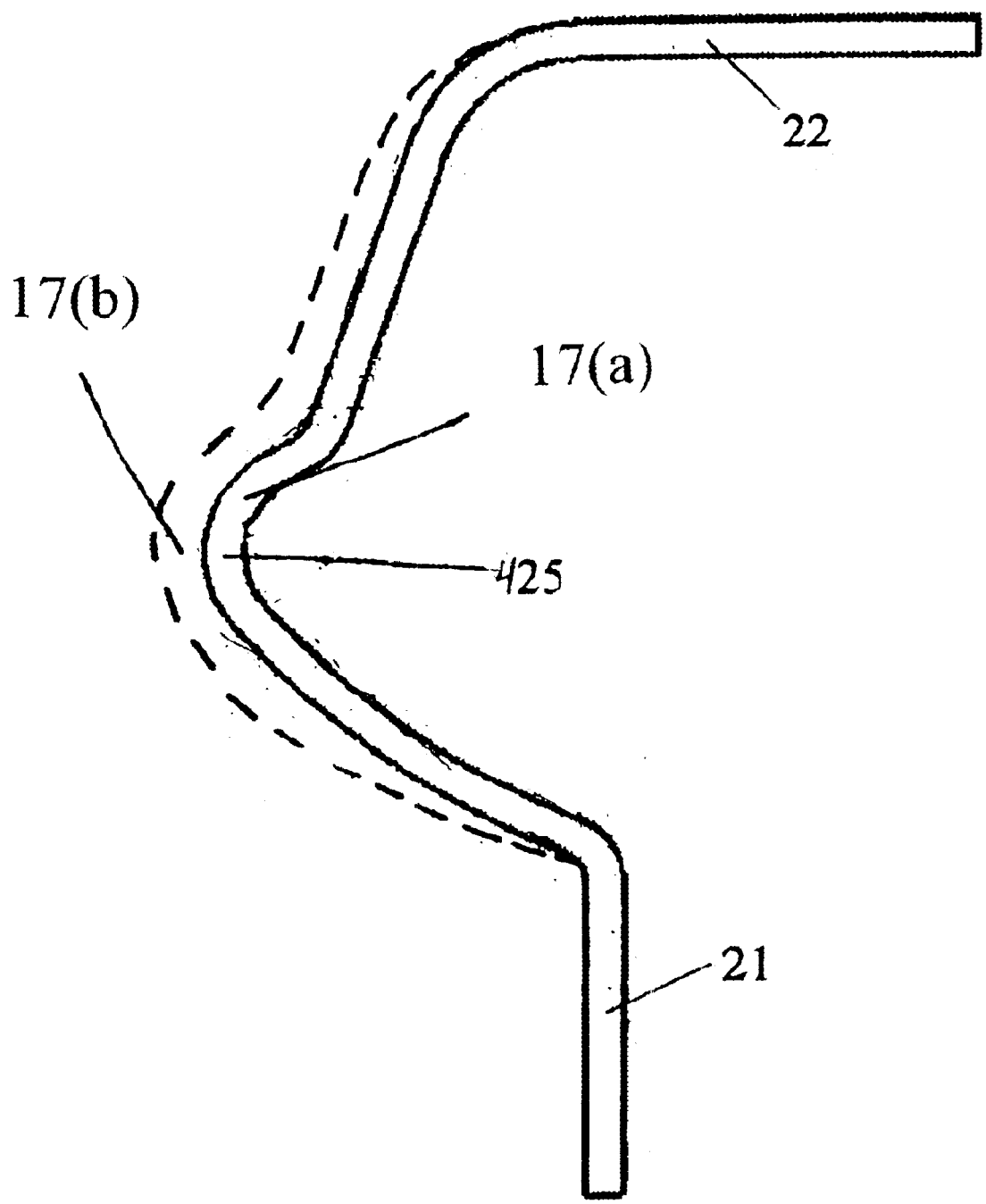
FIG. 17 presents a wheel disk having an increase in disk thickness.

FIG. 16 presents an embodiment of a wheel disk according to the invention, where view 16(*a*) presents the profile of the disk in one axial plane and view 16(*b*) shows the profile of the disk along another axial plane. In view 16(*b*), the thickness of the wheel disk, in the area of the curved protuberance, is increased, as compared to the thickness of the curved protuberance shown in view 16(*a*). FIG. 17 presents another embodiment of a wheel disk according to the invention, wherein the thickness of the wheel disk shown in view 17(*b*) is increased, as compared to the thickness of the disk shown in view 17(*a*).

Figure 18:
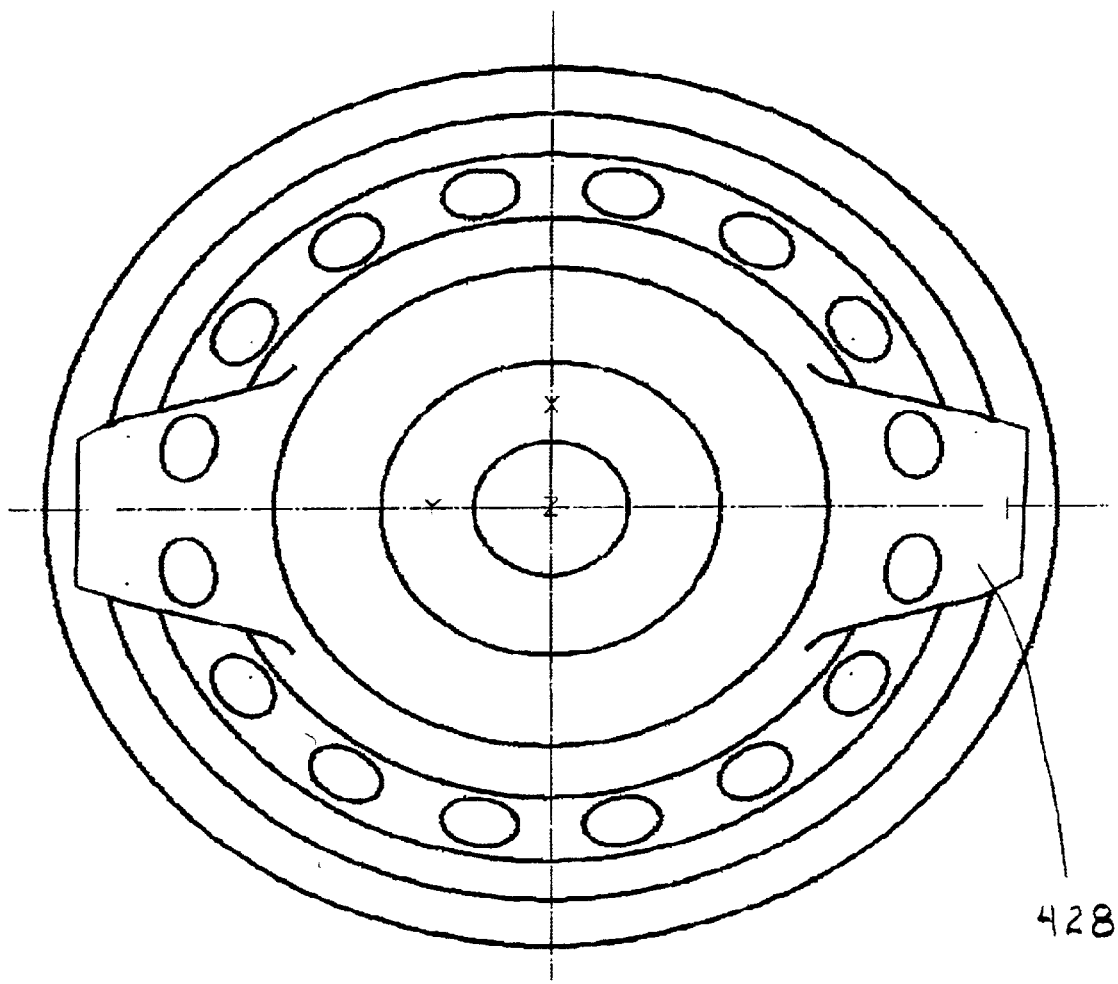
FIG. 18 represents a side view of a wheel with the link between the disk and the rim arranged under the rim outer flange.

FIG. 18 presents a side view of another embodiment of a wheel according to the invention with the link (428) between the disk and the rim arranged under the rim outer flange.

The disks according to the invention can be easily made by using the standard operating procedures employed in the fabrication of wheel disks. By forging or stamping with suitable tools, disks can be obtained with an oval curved protuberance or with variations of axial positions or even openings of different dimensions. A localized variation of thickness can be obtained with additional pieces added to the disk.

The natural modes of vibration of a wheel can be determined experimentally, as has already been seen. They can also be obtained by finite-element calculations.

Table 1 presents the results of finite-element calculations for different reference wheels according to the invention. Those wheels are designed without taking openings into account; the results therefore depart from real tests.

The third column of Table 1 gives the two frequencies of vibration of the first natural mode of the disk and the fourth column gives the mean frequency shift relative to the reference wheel.

TABLE 1

| Reference | Characteristics | Frequencies of the first natural mode of disk $D_1$ (Hz) | | Δ mean frequency |
|---|---|---|---|---|
| 1 | sheet steel reference wheel (FIGS. 1 and 2) | 310 | 310 | — |
| 2 | wheel with an oval curved protuberance (FIG. 5) (D-d = 30 mm) | 297 | 351 | 14 |
| 3 | wheel with a curved protuberance with a radial distance at a maximum and a continuous variation (FIG. 7) | 304 | 332 | 8 |
| 4 | wheel with a curved protuberance containing a hump (localized increase of axial distance/median plane P) (FIG. 8)(H-h-5 mm) | 308 | 338 | 13 |
| 5 | wheel with an oval curved protuberance and, in addition, a hump arranged along axis A (FIG. 9) | 295 | 369 | 22 |
| 5a | wheel with an oval curved protuberance and, in addition, a hump arranged along axis B | 320 | 358 | 29 |
| 6 | standard full-face wheel (FIG. 10(a)) | 232 | 232 | — |
| 7 | full-face wheel with oval channel (FIG. 10(b)) | 242 | 290 | 34 |
| 8 | full-face wheel with a localized hump | 235 | 255 | 13 |

The results show that localized stiffening of the wheel disk clearly entails a division of the frequencies of vibration of the first natural mode of the disk $D_1$. The amplitude of that split is a function of the amplitude of the geometric variations of the disks and of the shape of the latter.

The amplitude of the variations is particularly notable for full-face wheels, while keeping appreciably the same amplitude of variation of the geometric parameters as a function of the azimuth.

The foregoing finite-calculation results are confirmed by the test results presented in FIG. 3(*b*). That test was carried out with a wheel in which diametrically opposite angular sectors of some twenty degrees were stiffened by doubling the thickness of the curved protuberance (welding of reinforcing pieces). The results presented in FIG. 3(*b*) also show a split of frequency of the first natural mode of vibration of the disk $D_1$: it goes from 270 Hz for the reference wheel (FIG. 3(*a*)) to 290 Hz and 315 Hz for the wheel of doubled curved protuberance thickness.

A vehicle test on both of those same wheels was carried out to determine whether that vibration frequency split of the first natural mode of vibration of the disk $D_1$ could have an effect on the body hum heard in the passenger space of a vehicle. The vehicle was a Renault Megane equipped, first, with four identical wheels corresponding to reference wheel 1 and, thereafter, with four identical wheels of doubled curved protuberance thickness according to the invention. The tires were Michelin MXT E, and the test speed was 80 km/h.

Figure 12:
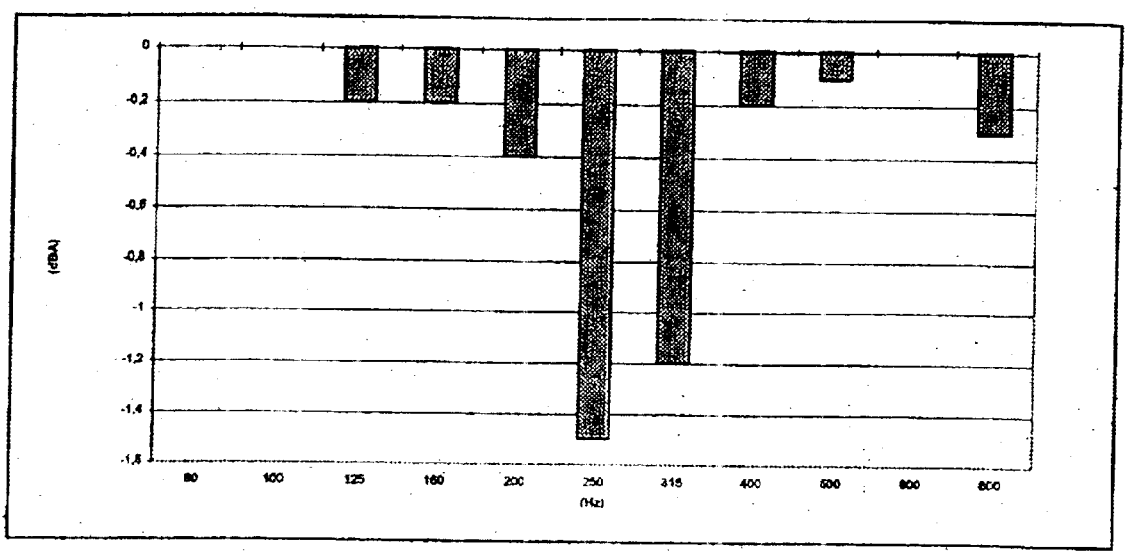
FIG. 12 presents the results of an octave third band analysis of a vehicle wheel test according to the invention.

FIG. 12 presents the results of the octave third band analysis of the test on the aforementioned vehicle. That analysis gives the measured difference of solution 2 relative to the reference wheels in the 80–800 Hz frequency range.

An appreciable reduction of the body hum noise was observed, which could reach 1.5 dBA in the band centered on 250 Hz, where body hum noise peaks are situated.

This result shows that the wheels according to the invention effectively make it possible to attenuate substantially the body hum heard in the passenger space of a vehicle.

What is claimed is:

1. A vehicle wheel, comprising:

an annular rim, an annular disk having a central axis, a radially inner center zone for attachment of the disk to a vehicle, a radially outer zone of connection to the rim, and a radially intermediate zone between the center zone and the connection zone; and the disk intermediate zone comprising a first given angular sector about said central axis and one or more other angular sectors about said central axis, wherein said first given angular sector including means for stiffening the wheel against axial bending relative to said other angular sector or sectors, and wherein each of said other angular sectors lies about a different diametrical axis and has the same central angle as said first given angular sector.

2. The vehicle wheel according to claim 1, wherein the disk intermediate zone comprises a second given angular sector located diametrically opposite to and having the same central angle as said first given angular sector, said second given angular sector including means for stiffening the wheel against axial bending relative to said other angular sectors of the intermediate zone.

3. The wheel according to claim 1 or 2, wherein said means for stiffening comprises an increase in at least one geometric parameter chosen from the group consisting of disk thickness, axial distance relative to the median plane of the wheel, and radial distance relative to the axis of rotation of the wheel.

4. The wheel according to claims 1 or 2, wherein:

said intermediate zone comprises a zone of openings and a profile with a curved protuberance; and said means for stiffening comprises an increase in the thickness of said curved protuberance in said given angular sector or sectors.

5. The wheel according to claim 1 or 2, wherein:

said intermediate zone comprises a zone of openings and a profile with a curved protuberance; and said means for stiffening comprises an increase in the axial distance between the curved protuberance and a median plane of the wheel in said given angular sector or sectors.

6. The wheel according to claim 1 or 2, wherein:

said intermediate zone comprises a zone of openings and a profile with a curved protuberance; and said means for stiffening comprises an increase in the radial position of said curved protuberance and the axis of rotation of the wheel in said given angular sector or sectors.

7. The wheel according to claim 1 or 2, wherein:

said intermediate zone comprises a zone of openings; and the surface area of said openings is inferior in said given angular sector or sectors relative to the surface area of said openings in the other angular sectors.

8. The wheel according to claim 1 or 2, wherein:

said intermediate zone comprises a zone of openings; and said means for stiffening comprises stiffening the edges of said openings located in said given angular sector or sectors.

9. The wheel according to claim 3, wherein said increase is continuous as a function of the azimuth.

10. The wheel according to claim 3, wherein said increase is obtained through circumferentially localized humps.

11. The wheel according to claim 1 or 2, wherein:

said rim includes an outer seat and a rim well and is connected to said disk by a link;

within said given angular sector or sectors, said link between the disk and the rim is arranged under the outer seat of the rim; and within the other angular sectors, said link is arranged under the rim well.

12. The wheel according to claim 1 or 2, wherein:

said rim includes an outer flange and a rim well and is connected to said disk by a link;

within said given angular sector or sectors, said link between the disk and the rim is arranged under the outer flange of the rim; and within the other angular sectors, said link is arranged under the rim well.

* * * * *